United States Patent [19]

Terrizzi

[11] Patent Number: 5,407,312
[45] Date of Patent: Apr. 18, 1995

[54] FASTENER SYSTEM WITH AN ENTRAINABLE FUNCTION-FACILITATING MATERIAL

[76] Inventor: A. Scott Terrizzi, 34 Cambry La., Elkton, Md. 21921

[21] Appl. No.: 130,769

[22] Filed: Oct. 4, 1993

[51] Int. Cl.6 .............................................. F16B 39/34
[52] U.S. Cl. .................................. 411/304; 411/369; 411/915
[58] Field of Search ............... 411/364, 369, 542, 915, 411/258, 82, 418

[56] References Cited

U.S. PATENT DOCUMENTS

| | | | |
|---|---|---|---|
| 2,409,638 | 10/1946 | Lyon | 411/304 |
| 2,752,814 | 7/1956 | Iaia | 411/542 |
| 3,247,752 | 4/1966 | Greenleaf | 411/542 |
| 3,897,713 | 8/1975 | Gugle | 411/82 |
| 4,701,088 | 10/1987 | Grull | 411/369 |

FOREIGN PATENT DOCUMENTS

| | | | |
|---|---|---|---|
| 1031583 | 6/1966 | United Kingdom | 411/369 |
| 1040083 | 8/1966 | United Kingdom | 411/304 |

*Primary Examiner*—Flemming Saether
*Attorney, Agent, or Firm*—M. K. Silverman

[57] ABSTRACT

A fastening system includes a bolt having a threaded shank and a head having upper and lower bases, the shank extending integrally from the lower base of the head, the lower base provided with a concentric function-facilitating material reservoir channel and the lateral surface of the threaded shank also provided with a function-facilitating reservoir channel, each of the channels provided with a function-facilitating material selected from a bonding agent, a friction-inducing agent, a lubricant, a sealing agent such as a caulking compound, a resilience-providing agent, or combinations of such materials.

6 Claims, 2 Drawing Sheets

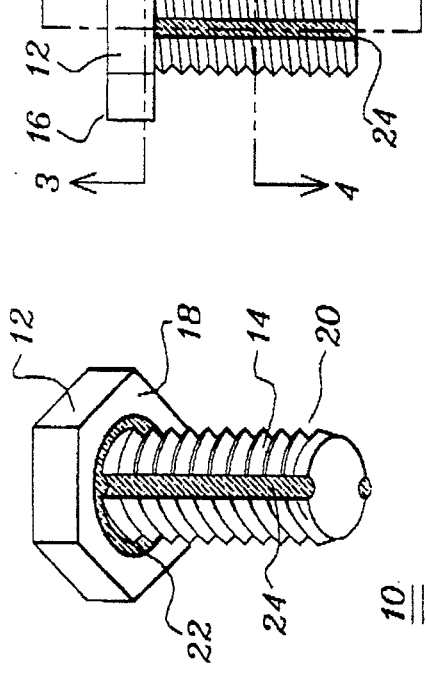
FIG. 1.
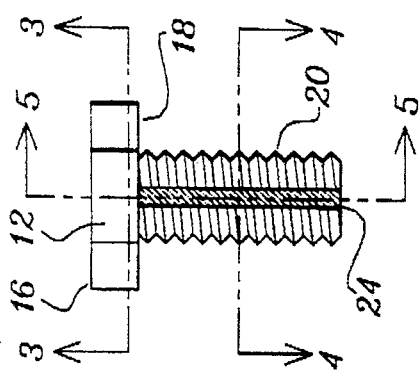
FIG. 2.
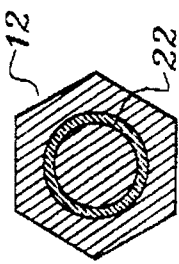
FIG. 3.
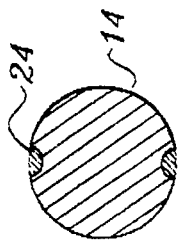
FIG. 4.
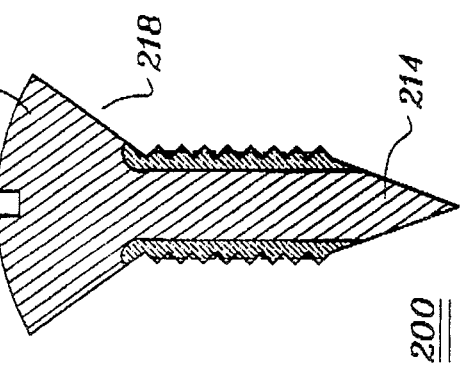
FIG. 5.  FIG. 5a.
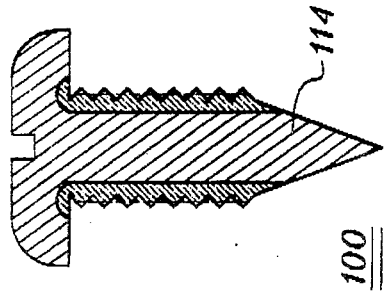
FIG. 6.
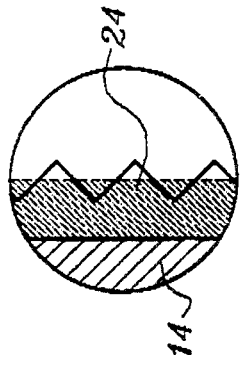
FIG. 7.
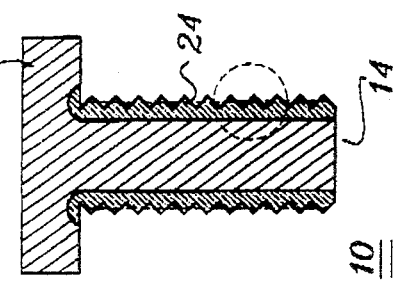

FASTENER SYSTEM WITH AN ENTRAINABLE FUNCTION-FACILITATING MATERIAL

BACKGROUND OF THE INVENTION

1. Area of Invention

The present invention relates to the area of fastening means and, typically, fasteners that are typically used in combination with a solid or semi-solid phase function facilitating material such as a caulking agent.

2. Prior Art

The prior art in the instant area comprises fasteners such as bolts, screws and other means provided with either or both a threaded shank and a head adapted for use in combination with a washer, More particularly, in prior art efforts to optimize the relationship of a fastener relative to a medium intended to be fastened, thereby, it is typical to provide, either into a recess of such medium or by physical adhesion onto the shank or head of the fastener itself, one or more types of solid or semi-solid phase pressure responsive function facilitating materials such as bonding agents, sealing agents such as caulking compounds, friction reduction agents such as lubricants, resilience-providing agents and combinations thereof.

As may be well appreciated by one familiar with the use of screws, bolts and the like, the provision to a screw or bolt, or the recess into which the screw or bolt is to be installed, with an appropriate bonding, sealing or lubricating agent, is not only a time-consuming and tedious task but, furthermore, such semi-solid facilitating materials will typically degrade over time such that, in many areas of use of screws or bolts, even the most conscientious and thorough installation of a fastener in combination with the desired function facilitating material will, over time, result in the oxidation or dehydration of the material so that it cannot retain its intended function. Accordingly, it is not unusual that various classes of installation of screws and bolts, no matter how appropriately installed, will, over time, loosen or otherwise degrade such that the overall intended effect of the combination of the fastener and the function facilitating material is defeated.

Further, where a bolt or other fastening means is provided with a washer, such washers are often formed of a material that is itself degradable such that, eventually, the underlying function of the washer, e,g., sealing, resilience-providing, or friction-inducing will be defeated. The instant invention therefore addresses the problem of washer degradation as well as that of loss of the original function of solid and semi-solid phase materials used in combination with the original installation of the fastener into the medium of interest.

The prior art, as best known to the inventor, does not offer a solution to any of the above set forth problems.

SUMMARY OF THE INVENTION

The invention relates to a fastening system comprising a bolt or screw having a threaded shank and a head having an upper and lower base, said shank depending integrally from said lower base of said head, said lower base of said head provided with a concentric function-facilitating material channel relative to the cylindrical surface defined by said shank, said shank preferably including a channel oriented transversely to the threads thereof, said concentric channel and said transverse channel defining reservoirs within which are provided one or more solid entrainable function-facilitating materials selected from the group including bonding agents, sealing agents, lubricants, friction-inducing agents, resilience-providing agents, and combinations thereof. A given fastener may be provided with the concentric reservoir channel whether or not it is provided with a shank reservoir channel, or vice versa.

It is an object of the present invention to provide a fastening system in which a bolt, screw or related fastener is provided, at the time of original production thereof, with a solid phase function-facilitating material such that, over time, the function of interest will be continuously provided to the interface between the fastener means and the medium to be fastened.

It is another object to provide a system by which the interface between a fastener and the medium to be fastened is, over a period of years, provided with a supply of a function-facilitating material such as a sealant, lubricant, bonding or friction-inducing means.

It is a further object of the present invention to provide a substitute means for a washer which, over an extended period of time, will provide the function of a classical washer as well as other material-based functions.

It is a yet further to provide a fastening system that will reduce the labor associated with the installation of elements thereof when it is necessary or preferable to employ a fastener in combination with a function-facilitating material such as a bonding, sealing, lubricating, friction-inducing, or resilience providing-agent.

The above and yet other objects and advantages of the present invention will become apparent from the hereinafter set forth Brief Description of the Drawings, Detailed Description of the Invention and claims appended herewith.

BRIEF DESCRIPTION OF THE DRAWINGS

FIG. 1 is a perspective elevational view of an embodiment of the instant invention in which the lower surface of the head of a fastener is provided with a washer reservoir channel and the shank thereof is provided with a reservoir channel for function-facilitating materials.

FIG. 2 is a front plan view of the fastening system of FIG. 1.

FIG. 3 is a radial cross-sectional view of FIG. 2 taken along Line 3—3 thereof.

FIG. 4 is a radial cross-sectional view of FIG. 2 taken along Line 4—4 thereof.

FIG. 5 is a longitudinal cross-sectional view of the invention taken along Line 5—5 of FIG. 2.

FIG. 5a is an enlarged portion of FIG. 5 showing the detail of the thread along the channel.

FIGS. 6 and 7 are longitudinal views, of the nature of FIG. 5, however with reference to other fastener configurations to which the instant invention is applicable.

DETAILED DESCRIPTION OF THE INVENTION

Figure 9:
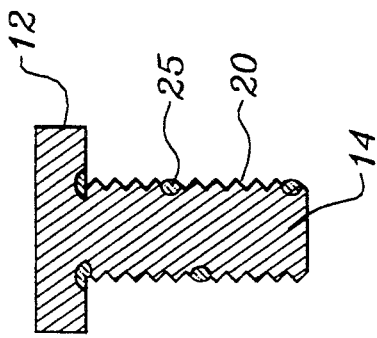
FIG. 9 is an axial longitudinal cross-sectional view of the system of FIG. 8 taken along Line 9—9 thereof.

With reference to FIGS. 1 to 5 there is shown a fastener in the nature of a bolt 10 which includes a head 12 and shank 14. As may be noted said head includes an upper base 16 and lower base 18, while said shank 14 exhibits a plurality of pitched threads 20.

Also included within the embodiment of FIGS. 1 to 5 is a concentric material reservoir channel 22 located within lower base 18 of head 12 and a shank reservoir channel 24 disposed transversely to said threads 20 of shank 14 of bolt 10. The purpose of said reservoir channels 22 and 24 is, in combination with bolt 10, to provide a supply of a function-facilitating material in which such material is selected from the group of materials entrainable solid including bonding agents, friction-inducing agents, lubricants, resilience-providing agents, sealing agents such as a caulking compound, and combinations thereof.

In the case of concentric reservoir channel 22 the function thereof will, most commonly, be that of a substitute for, or equivalent of, a washer, that is, means by which appropriate properties of sealing and resilience can be provided between lower base 18 of head 12 and the surface of the medium to be secured by the bolt 10. For example, through the use of a rubberized material within reservoir channel 22, the properties of a polymeric washer can be simulated and the effect thereof achieved, not only in the short term but, in view of the reservoir-like property of the materials in the channels of the instant system, thru a continual feeding to the interface between lower space 18 and the medium into which bolt 10 is secured. This function will far exceed the time-frame over which a typical prior art polymeric washer would provide such a function, In those many applications where a washer would not be normally used but, however, in which a sealing agent such as a caulking compound would be employed between said lower base 18 and the surface of the medium (such as sheet metal) into which the bolt 18 would normally be secured, said concentric channel 22 may simply be filled with a solidified caulking compound which, responsive to the application of pressure thereupon during the process of tightening head 12 into the medium to be fastened, an effective change of state, from solid to that of a putty or gel-like state will occur, thereby depositing an effective quantity of sealing agent to the fastener-medium interface.

With respect to said shank reservoir channel 24 there will be provided therein a solidified pressure-responsive agent which will be dictated by the particular application of the system. For example, where a conventional sealing operation is indicated, material such as a solid phase caulking compound will be provided within channel 24, having a property such that, upon the application thereto of pressure, as through the rotation of the bolt within the medium to be fastened, such solid phase sealing agent will change to the more conventional gel-like caulking compound to thereby create an effective seal between the threads 20 of shank 14 and the interior of the fastened medium. As in the case of said channel 22, the function of the material in channel 24 will occur over a period of time thereby providing to the interface with the secured medium a long term sealing function.

It is to be appreciated that within the scope of the present invention there may be provided, within said channel 24, other function facilitating materials such as friction-inducing agents, lubricants, and bonding agents as where a permanent, fixed relation between the bolt 10 and fastened medium is desired.

With reference to FIG. 6, the application of the instant invention to a pan head screw 100 is shown. The only difference between this embodiment and that of FIGS. 1 thru 5 lies in the shape of shank 114 thereof.

With reference to FIG. 7 there is shown the application of the instant invention to a countermount head screw 200. Said screw 200 differs from the geometry of said pan head screw in the configuration of head 212 thereof. Clearly, in this embodiment, the lower base 218 of head 212 will be at an obtuse angle relative to longitudinal axis of shank 214, as opposed to the right angle of the lower bases relative to the shanks in the embodiments of FIGS. 1 thru 6.

It is to be appreciated that the principles of the instant invention are also applicable to a wide variety of other types of fasteners including, without limitation, glove button snaps, lift-o-dot studs of the machine and sheet metal types, turn-buckle screws and tex screws.

Figure 8:
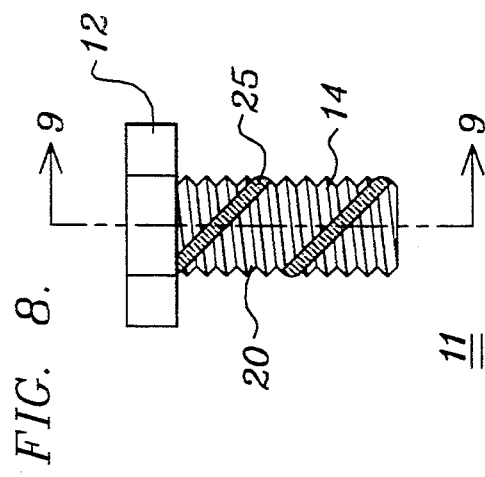
FIG. 8 is a view of the inventive system, similar to the view of FIG. 2, however in which the shank channel reservoir thereof is spiral relative to the longitudinal axis of the shank.

With reference to FIGS. 8 and 9, there is shown an embodiment of the instant invention in which the shank 14 of a bolt 11 is provided with a spiral reservoir channel 25 which is oriented at an angle of approximately 45 degrees relative to the angle of pitches 20. Therein it is to be appreciated that the pitch of the spiral of spiral channel 25 may be much greater than that shown in FIGS. 8 and 9 to, thereby, provide for greater quantities of the function-facilitating material of interest, for example, a sealant, bonding agent, lubricant, or combinations thereof as, for example, where a lubricant is needed toward the lowermost part of shank 14 and a sealing or bonding agent is called for in the upper portions of the shank closer to head 12.

Figure 10:
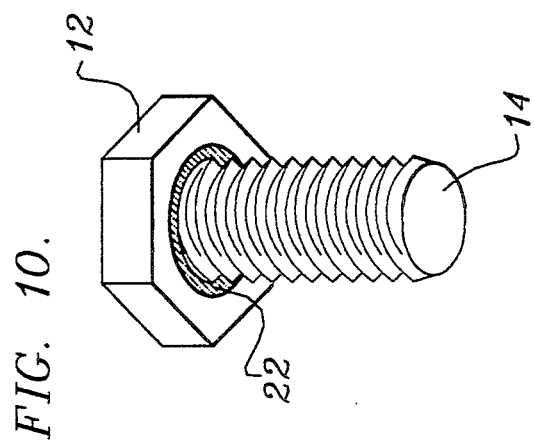
FIG. 10 is a view, similar to the view of FIG. 1, in which the inventive system is provided only with a washer reservoir channel.

With reference to FIG. 10 there is shown an embodiment of the instant invention in which a bolt or other fastening means of interest is provided only with the "washer equivalent" concentric channel without the above described shank channels 24 or 25.

Figure 12:
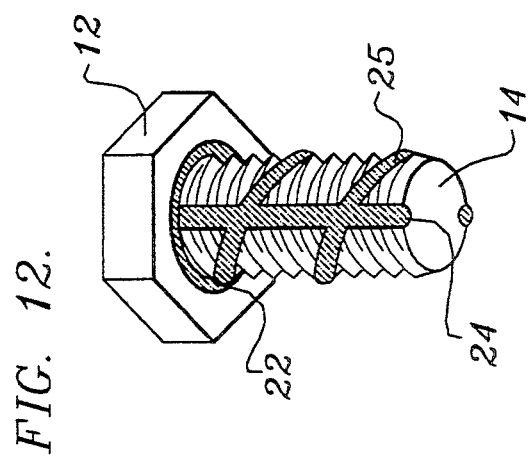
FIG. 12 is a view similar to the view of FIG. 1, in which the system is provided with washer, linear shank, and spiral shank channels.
Figure 11:
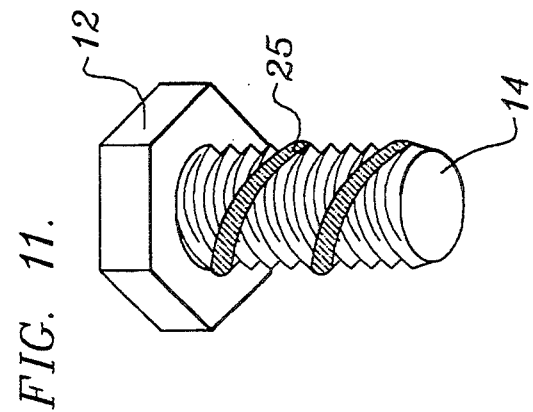
FIG. 11 is a view, similar to the view of FIG. 1, in which the system is provided only with a spiral shank reservoir channel.

Conversely, there is shown in FIG. 11 an embodiment of the instant invention consisting only of a shank channel without a concentric channel. It is, thereby, to be appreciated that the respective concentric head channel within the lower base and the shank channel 24 and 25 may be used separate and apart from each other. Also, it is to be appreciated that the type of shank channels 24 and 25 may, as well, be used in combination with each other as is shown in FIG. 12.

Accordingly, while there has been shown and described the preferred embodiment of the instant invention it is to be understood that the invention may be embodied otherwise than is herein specifically shown and described and that within said embodiment certain changes may be made in the form and arrangement of the parts without departing from the underlying idea or principle of this invention as set forth in the claims appended herewith.

Having thus described my invention what I claim as new, useful and non-obvious and, accordingly, secure by Letters Patent of the United States is:

1. A fastening system comprising a fastener itself comprising:

(a) a threaded shank provided with a material reservoir channel extending along a length thereof in which there is provided within said channel a solid material selected from the group of materials consisting of bonding agents, friction-inducing agents, lubricants, sealing agents, resilience-providing agents and combinations thereof; and (b) a head having upper and lower bases thereof, said lower base including a material reservoir channel concentric relative to said shank in which there is provided within said channel a solid function-facilitating material selected from the group of materials consisting of bonding agents, friction-inducing agents, lubricants, sealing agents, resilience-providing agent, and combinations thereof, in which said shank channel and said materials thereof respectively define a region of communication with said annular lower base channel and said material thereof.

2. The system as recited in claim 1, in which said fastener comprises a screw.

3. The system as recited in claim 1, in which said shank channel comprises a channel disposed transversely to threading on said shank.

4. The system as recited in claim 1, in which said shank channel defines a spiral upon the lateral surface of said shank, said spiral having a different pitch than the pitch of said threadings of the shank.

5. The system as recited in claim 1, in which said fastener comprises a bolt.

6. The system as recited in claim 1 in which said fastener comprises a screw.

* * * * *